May 10, 1960 M. ROSENBERG 2,936,446

SHIFT REGISTER DRIVING SYSTEM

Filed May 25, 1959

INVENTOR.
MILTON ROSENBERG
BY Lyon & Lyon
ATTORNEYS.

United States Patent Office 2,936,446
Patented May 10, 1960

2,936,446

SHIFT REGISTER DRIVING SYSTEM

Milton Rosenberg, Santa Monica, Calif., assignor to Telemeter Magnetics, Inc., Los Angeles, Calif., a corporation of New York Application May 25, 1959, Serial No. 815,682

7 Claims. (Cl. 340—174)

Figures 1, 2:
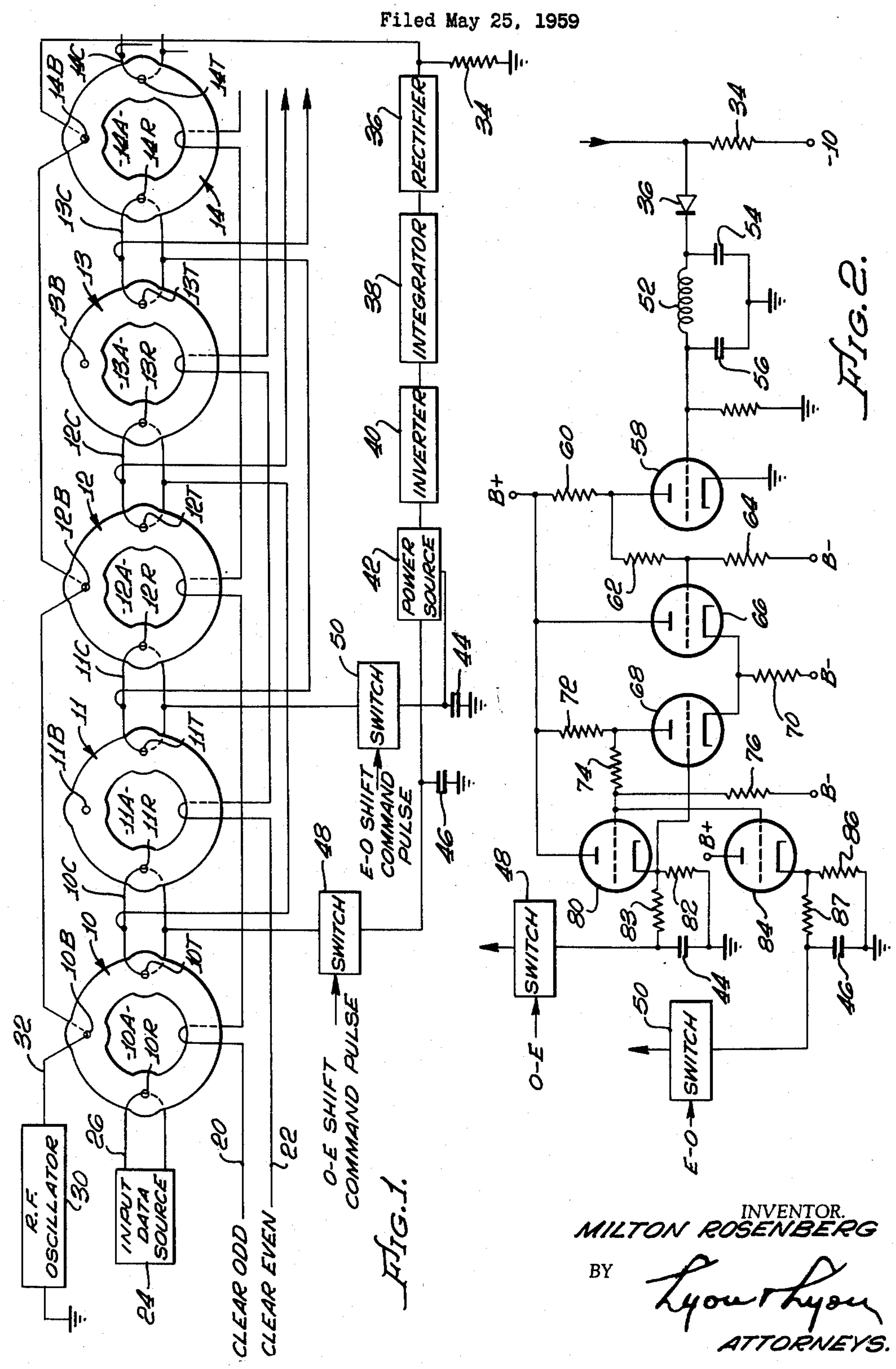

This invention relates to electronic storage circuits known as shift registers, and, more particularly, to an improved driving system for such shift registers.

The shift register normally finds extensive use in information-handling machines where it is desired to delay or temporarily store small amounts of data. The shift register usually comprises a plurality of bistable state devices, each of which represents a bit of data by its stable state. The bistable state devices are interconnected for data transfer. Such data transfer is usually known as a shift. Upon the application of a pulse of current to the register, there is a simultaneous transfer of the bits of data within the register, whereby a bistable state device, which effectively is storing a bit of data, transfers its state to a succeeding bistable state device.

Where shift registers are composed of bistable state devices, such as trigger circuits, which use vacuum tubes or even transistors, then the load which the shift register places upon the source of shift pulses is constant, regardless of the number of ones or zeroes stored in the shift register. This arises by reason of the fact that the impedance presented by a flip-flop circuit to a driving source, wherein the flip-flop circuit employs tubes or transistors, is the same regardless of the state of the flip-flop circuit. However, where magnetic cores are employed as the bistable state element for a shift register, then the impedance presented to a driving pulse source by a magnetic core will have two different values, depending upon whether the core is in one or the other of its two states of stable remanence. Further, the impedance presented to a driving pulse source by a magnetic-core shift register will vary with the information content, or the different states of remanence of the cores in the register whereby they represent data.

In a shift register device of a type described in an article entitled "Magnetic Elements for Logic Systems," by Hewitt D. Crane, in the January 1959 issue of the I.R.E. Proceedings, or of a somewhat similar type entitled "Diodeless Magnetic Shift Registers Utilizing Transfluxors," which appears in the December 1958 issue of the I.R.E. Transactions on Electronic Computers, it is a basic requirement for the operation of the register that a constant current drive be maintained. Since the load varies in accordance with the information content of the register, for obtaining a constant-current driving system for such a load either a driver which has a high internal impedance, such as a pentode, is utilized, or, when thinking in terms of a low-impedance driver, resistance is artificially added. In both instances, the efficiency of energy transfer to the load is very low.

An object of this invention is to provide a novel driving system for a shift register which has a high efficiency of energy transfer.

Another object of the present invention is to provide a unique constant-current driving system for a shift register of the type wherein the load presented by the shift register to a driving source varies in accordance with the information content of the register.

Yet another object of the present invention is to provide a drive system for a shift register, wherein the efficiency of energy transferred to the load is greater than that heretofore available.

These and other objects of the invention may be achieved by a circular arrangement whereby provision is made for establishing an analog signal which represents the impedance of the load by being proportional to the "one" contents of the register. This analog signal is then employed to regulate the stored energy of the source to the extent that the current applied to the register for shifting the contents is just enough. In short, the value of the shift current is maintained constant, regardless of any variations in the data introduced into the shift register.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a block schematic diagram of an embodiment of the invention; and

Figure 2 exemplifies circuitry which may be employed in the embodiment of the invention shown in Figure 1.

Referring now to Figure 1, there may be seen the combination of the embodiment of the invention with a magnetic-core shift register of the type described in the aforementioned article by H. D. Crane. It should be understood that the description of this invention in connection with the type of shift register shown is not to be construed as a limitation upon the invention, since those skilled in the art will readily recognize that the invention concepts may be applied to other types of shift registers or circuits where the impedance of the arrangement being driven varies with the type of data therein, and it is possible to derive a signal representative of that data or the impedance without affecting the data storage whereby the drive current can be maintained constant.

In order to assist in an understanding of this invention, the principles of the operation of the magnetic-core shift register shown will be briefly reviewed here. The shift register uses multiaperture cores 10, 11, 12, 13, and 14. These cores exemplify shift registers which may have a much larger number of cores employed therein. Each multiaperture core will contain a main aperture 10A, 11A, 12A, 13A, and 14A, which is the opening surrounded by the toroid. Each core may have a plurality of small apertures in the toroid ring. One of these apertures is designated as the receive aperture 10R, 11R, 12R, 13R, 14R. Another of the small apertures is designated as the transmit aperture 10T, 11T, 12T, 13T, 14T. A third of the small apertures may be designated as the readout aperture 10B, 11B, 12B, 13B, 14B.

Each of the magnetic cores employed in the shift register will preferably have at least two stable states of magnetic remanance. The cores are respectively designated as odd and even cores, as can readily be determined by their order or sequence, starting with the first core 10. For each data bit to be stored in the shift register, two magnetic cores are provided; one is the odd core, and the other is the even core. Data is stored in one or the other of these, but never in both. Another required property of the cores in the type of register described is that their hysteresis characteristics should preferably be rectangular.

As previously pointed out, data in the shift registers is stored simultaneously in the odd cores; thereafter, a transfer can be made so that the data is stored simultaneously in the even cores of the shift register. After the data is transferred to the even cores of the shift register, it is necessary to clear, or reset, the odd cores so that they are in condition to receive data. Such resetting, or clearing, operation is provided by a clear-odd coil 20, which is inductively coupled to all the odd cores of the shift register through their main apertures 10A, 12A, and 14A. Similarly, when data is transferred from the even cores to the odd cores, the even cores are cleared by the application of a clear current to a clear-even coil 22. This clear-even coil 22 is coupled to all the even cores in the shift register sequence by their main apertures 11A, 13A, etc. Data is introduced into the shift register via the first core 10 in the shift-register sequence. The data is received from an input-data source 24, which is coupled by a coil 26 to the receive aperture 10R of the first core 10.

An explanation of the operation of a multi-aperture core is set forth in detail in the aforementioned article by H. D. Crane. Briefly, however, when a core is in its clear state, in order to drive this core to its set state, it is necessary to apply a current to a winding, such as 26, which is coupled to the receive aperture of the core, which current exceeds a certain threshold value. This threshold value is determined by a number of factors, including the size of the core and the material of which it is composed. If the current does not exceed the threshold value, then the direction of the flux lines within the core, as well as the flux, remains unaffected. The core remains in its clear state and may be said to represent a zero in this condition. However, should the input data source apply a current to the coupling coil 26, which exceeds the threshold level for the core, then the direction of the flux within the core will be changed, whereby the core may be said to be in its set state, and thereby can represent or store a binary one.

The transmit aperture of each core in the shift register is coupled to the receive aperture of a succeeding core by a transfer coil, respectively 10C, 11C, 12C, 13C, 14C. In order to shift data within the shift register from the odd cores to the even cores, current is applied to all the transfer coils which couple the transfer apertures of the odd cores to the receive apertures of the even cores. Similarly, in order to transfer data from the even cores to the odd cores, the shift current is applied to the transfer windings which couple the transmit aperture of the even cores to the receive apertures of the odd cores.

For the purposes of further explanation, consider now only cores 10, 11, and the transfer coil 10C. If core 10 is in its clear state, representing a zero, a current applied to the transfer coil 10C, which has the value of twice the threshold current, at first will split evenly between the two halves of the transfer coil, thereby passing through the aperture 10T and the aperture 11R. Since this current does not exceed the threshold value, there will be no effect upon the core 10, and it will remain in its clear state. Similarly, the current having threshold value will have no effect on the core 11, and it will remain in its clear state. Thus, if the core 10 is in its zero state, the application of a shift current pulse to the transfer winding having a value on the order of twice the threshold current value will not affect core 11, which will indicate a binary zero by the state of remanence at which it remains. However, should the core 10 have been transferred to its set state, whereby it is storing a one, the application of current having a threshold value to the transmit aperture 10T causes a change in flux to occur. The reason for this is that when a core is driven to its set state, the value of the threshold current required to cause a flux change in that core is lower than the value of the threshold current required to cause a flux change when the core is in its zero, or clear, state. Thus, the flux changes caused in the transmit aperture 10T induces a voltage in the transfer coil 10C, which operates to steer substantially all of the current being applied to the transfer coil to the half of the transfer coil which passes through the receive aperture 11R. This current-steering effect causes a current to pass through the aperture 11R, which exceeds the threshold value necessary to drive the core 11 from its clear to its set state. Core 11 is so driven. Thus, upon the termination of the shift current pulse, core 11 is in its set state, and the transfer of a one from core 10 to core 11 has been accomplished. Thereafter, a clear current is applied to the clear-odd coil 20, whereby core 10 is returned to its clear state to receive another bit of data.

The description of the transfer of data between core 10 and core 11 applies to the transfer of data between all odd cores and all even cores. The shift current pulse which is applied to the transfer coil 10C is also applied to all other transfer coils coupling odd cores to succeeding even cores. The manner of the current application is as shown. The current is applied to the center of the lower half of the first transfer winding 10C. From the center of the upper half of the first transfer winding 10C, a connection is made to the center of the lower half of the next transfer winding 12C. From the center of the upper half of this transfer winding, connection is made to the center of the lower half of the succeeding transfer winding coupling the succeeding odd core to its following even core. The explanation also applies to the mechanics of the transfer of data from the even cores to the odd cores. Current is applied in series to all the transfer coils which couple the transmit apertures of the even cores to the receive apertures of the odd cores. The current is applied to each transfer coil at the center of the lower half of the transfer coil and is removed from the center of the upper half of the transfer coil. The value of the current which is applied is twice the threshold value which is required to drive a core in its clear state to its set state.

It should be noted that the value of the current which is applied to the transfer windings must be closely regulated. If the value of the current exceeds twice the threshold value, it can succeed in driving cores from their clear to their set states. Obviously, this will insert ones in the register where none should be inserted. If the transfer current is too low, that is, it does not exceed the threshold required to drive a core which is in its set condition, then there will be no transfer of data between cores. Since effectively the load across which current is applied includes a plurality of coils coupled to a plurality of cores, the impedance of that load is determined by the state of remanence, or clear and set states, of the magnetic cores to which the coils are coupled. Without some steps being taken to maintain the driving current constant, its value can vary as the impedance of the load which, in turn, is a function of the data in the shift register which it is sought to shift.

In accordance with this invention, the shift current pulse which is applied to cause a transfer of data within the shift register is maintained constant by effectively nondestructively reading the data stored and regulating the shift current pulse in accordance with a control signal developed as a result of such nondestructive readout. A radiofrequency oscillator 30, which frequency may be on the order of one megacycle, applies its output to a reading coil 32, which is coupled to all the reading apertures 10B, 12B, 14B of the odd cores in the shift register. An impedance, such as a resistor, 34 is connected in series with the reading coil 32. The magnetomotive force output achieved by the drive applied to the reading coil is of such magnitude as to switch the flux around the reading apertures linked by the reading coil, only assuming that a core is in its set state. If the core is not in its set state, then there is no occurrence of a flux switching around the reading apertures. This is effectively a nondestructive-readout method, which is described in detail in an article entitled, "The Transfluxor—A Magnetic Gate With Stored Variable Setting," RCA Review, volume 16, pp. 303–311, June 1955.

The function of the oscillator, reading coil, and the impedance, respectively 30, 32, 34 is a dual one. First, a method is provided for nondestructively reading the state of all the cores to which the reading coil is coupled, and, secondly, a voltage is developed across the impedance 34, which is inversely proportional to the "one" content of all the cores to which the reading coil is coupled. Since these cores are on-half of the cores of the shift register in which the data is first inserted, effectively, the data in the shift register is interpreted and transformed into an analog voltage value.

The voltage drop across the impedance 34 is then applied to a rectifier 36, the output of which is applied to an integrating network 38. The integrating-network output is a direct-current signal which is applied to an inverter 40. The output of the inverter is applied to a power source 42 for the purpose of controlling the amount of the charge which is applied to the capacitors 44 and 46. The value of this charge is determined by the control signal derived from the information (ones) in the shift register. Effectively, by regulating the voltage to which the capacitors 44, 46 are charged from information as to the value of the impedance into which the capacitors will be discharged, the current which flows may be maintained constant.

Capacitor 46 is discharged through a switch represented by the rectangle 48 into the transfer coils coupling the odd-to-even cores, whereby an odd-to-even shift is effectuated. The switch 48 may be a switching transistor, for example, which is enabled to conduct upon the application thereto of an odd-to-even shift-command pulse from a suitable source (not shown). Similarly, the capacitor 44 is permitted to discharge through a switch 50 upon the application thereto of an even-to-odd shift-command pulse from a source not shown. The capacitor 44 discharges into the transfer coils, which couple the even-to-odd cores in the shift register.

Figure 2 is a circuit diagram of a suitable arrangement for the rectangles 36, 38, 40, and 42. The rectifier 36, which is coupled between the resistor 34 and the integrating network, may be a dry type of rectifier. The integrating network will include an inductance 52 and two shunt capacitors 54, 56, which connect the ends of the inductance to ground. The output of the integrating circuit is applied to the control grid of a tube 58, which amplifies and inverts the signal. Three resistors 60, 62, and 64 are connected across the operating-potential supply, and the anode of tube 58 is connected to the junction of resistors 60 and 62. The junction between resistors 62 and 64 is connected to the control grid of a tube 66. A tube 68 has its cathode connected to the common-cathode impedance 70, to which the cathode of tube 66 is connected. Effectively, therefore, the tube 58 is D.C. coupled to the control grid of tube 66.

Three resistors 72, 74, and 76 are connected across the operating-potential supply. The anode of tube 68 is connected to the junction of resistors 72 and 74; the junction of resistors 74 and 76 are connected to the control grid of a tube 80. The control grid of tube 68 is connected to the cathode of tube 80. A cathode impedance 82 is connected between the cathode of tube 80 and ground. The cathode of tube 80 is connected to the capacitor 46 through an isolating resistor 83 in parallel with the cathode resistor 82. Another tube 84 also has its control grid connected to the junction of resistors 74 and 76. This tube 84 has a cathode load resistor 86, and its cathode is connected to the capacitor 46 through an isolating resistor 87. Capacitors 44 and 46 are respectively connected to the switches 48 and 50.

Tubes 66 and 68 represent a bridge circuit which operates as follows. The signal which is applied to the grid of tube 66 will be directly proportional to the impedance of the register. A positive signal on the grid of tube 66 renders it sufficiently conductive so that tube 68 will be cut off by virtue of the current flow through tube 66 raising the potential sufficiently high on the common-cathode connection to accomplish this purpose. This results in the control grid of tube 80 having its grid voltage increased, whereby the current flow through tube 80 will charge capacitor 44 until such time as the potential at the cathode of tube 80 will reach a value at which tube 68, which is connected thereto, can commence to conduct. This reduces the value of the voltage being applied to the grid of the tube 80 while its cathode is still held up by virtue of the charge applied to the capacitor 44.

A similar operation occurs with tube 84 and capacitor 46. Tube 84 is enabled to conduct current and thus charge up capacitor 46 until such time as the voltage on the capacitor exceeds the control-grid voltage being applied to the tube. Effectively, the value of the charge applied to the capacitor, and thereby the voltage to which it is raised, is determined by the analog signal representative of the impedance of the shift register which will be presented to the capacitor when it is discharged. Thereby, the current which is applied to shift the contents of the shift register is maintained constant, despite variations in the impedance of the shift register which are occasioned by variations in the data which has been introduced. It will be noted that the reading coil is only coupled to the odd cores in the shift register. In view of the fact that the reading occurs by virtue of a radio frequency current being applied to the reading coil, the analog signal is established and maintained at a very much greater speed than the drive pulses which are applied to the shift register. Thereby, the analog signal may be obtained from only one set of cores in the shift register, since it will change as soon as new information is inserted into the register.

Accordingly, there has been described and shown a novel and useful arrangement for controlling the source for providing a driving current to a shift register in a manner so that the driving current is maintained constant, regardless of variations of the data which has been introduced into the shift register. Further, since the invention employs a stored energy type of source for the drive current, the standby power requirements are minimal.

I claim:

1. The improvement in a system for driving a shift register of the type having a plurality of bistable state devices interconnected for data transfer, each of which represents a bit of digital data by its stable state and can be driven from one to the other of its stable states, and means for entering data into said shift register, said improvement comprising means coupled to said plurality of bistable state devices for converting the digital data represented by the states of said bistable state devices to a representative analog value, means for applying shift current to said bistable state devices for transferring their states from one to another to advance the digital data represented thereby along said shift register, and means responsive to said representative analog value for maintaining constant the amount of the current applied by said means for applying a shift current to said bistable state devices regardless of the variations in data introduced into said register.

2. The improvement in a system for driving a shift register having a plurality of bistable state devices interconnected for data transfer, each of which represents a bit of digital data by its stable state and can be driven from one to the other of its stable states, and means for entering data into said shift register, said improvement comprising means for establishing an analog signal representative of the number of bistable state devices in said shift register which are in one of said bistable states, shift current terminals for said register, means for applying shift current from said source to said bistable state devices for transferring their states from one to another to advance the digital data represented thereby along said shift register, and means responsive to said analog signal for maintaining constant the current obtained from said source by said means for applying shift current regardless of variations in the numbers of those of said bistable state devices in their one states.

3. The improvement in a system for driving a shift register of the type having a plurality of magnetic cores interconnected for data transfer, each of said cores having two states of stable magnetic remanence one of which represents a binary one and the other a binary zero, each of said cores being drivable from one to the other state of magnetic remanence, and means for entering data into said shift register, said improvement comprising means coupled to said cores for establishing an analog signal representative of all the magnetic cores in said shift register in their one state of remanence without altering the state of remanence of said cores, shift current terminals for said register, means for applying shift current from said shift current terminals to said magnetic cores for transferring their states from one to another to advance the digital data represented thereby along said shift register, and means responsive to said analog signals for maintaining constant the amount of current transferred from said shift current terminals to said means for applying shift current regardless of the variations in data introduced into said register.

4. The improvement in a system for driving a shift register of the type having a plurality of magnetic cores as recited in claim 3 wherein said means coupled to said cores for establishing an analog signal representative of all the magnetic cores in said shift register in their one state of remanence without altering the state of remanence of said cores includes coil means coupled to those of the plurality of magnetic cores which will contain the information in said shift register in the interval between successive shift current application, means to apply an alternating current to said coil which has a frequency on the order of a radiofrequency, and an impedance in series with said coil means across which said analog signal is developed.

5. The improvement in a system for driving a shift register of the type having a plurality of multiaperture magnetic cores interconnected for data transfer, each of said cores having two states of stable magnetic remanence, one of which represents a binary one and the other a binary zero, each of said cores being drivable from one to the other state of magnetic remanence, and means to shift data within said register by the application of shift current to transfer windings interconnecting said plurality of multiaperture cores, said improvement comprising a readout coil coupled to alternate ones of said magnetic cores, means for applying a radiofrequency current to said readout coil, an impedance connected in series with said coil across which is developed a voltage representative of the number of cores to which said coil is coupled which are in the state wherein they represent a binary one, means for applying shift current to said register, and means responsive to said voltage for maintaining constant the shift current applied by said means for applying shift current regardless of variations in the data introduced in said register.

6. The improvement in a system for driving a shift register of the type having a plurality of multiaperture magnetic cores interconnected for data transfer as recited in claim 5 wherein said means responsive to said voltage for determining the amount of shift current applied by said means for applying shift current as the exact value required for shifting the data within the register includes a rectifier connected to said impedance, an integrating circuit to which said rectifier output is applied, a capacitor, a power source, means for discharging said capacitor from said power source, and means for controlling the amount of charge applied by said means for charging responsive to the output of said integrating circuit.

7. In a shift register of the type having a plurality of multiaperture magnetic cores interconnected for data transfer, each of said cores having two states of stable magnetic remanence, one of which represents a binary one and the other a binary zero, each of said cores being drivable from one to the other state of magnetic remanence, two cores respectively designated as odd and even cores being provided for each binary bit of information, first transfer windings for shifting data within said register from odd to even cores by the application of shift current to said first transfer windings and second transfer windings for shifting data from even to odd cores by the application of shift current to said second transfer windings, the improvement in driving said shift register comprising a readout coil inductively coupled to the same one of each two cores provided for each binary bit of information in said register, an impedance connected in series with said readout coil, means for applying a radiofrequency current to said readout coil and impedance whereby a voltage is established across said impedance which is representative of the number of cores to which said coil is coupled which are in their binary one state, a first capacitor, a second capacitor, means for charging said first and second capacitor in an amount controlled by said voltage, means for discharging said first capacitor into said first transfer windings to shift data from said odd to said even cores, and means for discharging said second capacitor into said second transfer windings to shift data from said even to said odd cores.

References Cited in the file of this patent

UNITED STATES PATENTS 2,911,628 Briggs et al. ............ Nov. 3, 1959

OTHER REFERENCES

"Multihole Ferrite Core Configurations and Applications," by H. W. Abbott and J. J. Suran, Proceedings of the IRE, August 1957.